(12) United States Patent
Nagai et al.

(10) Patent No.: US 10,103,612 B2
(45) Date of Patent: Oct. 16, 2018

(54) METHOD AND APPARATUS FOR MANUFACTURING LAMINATED IRON CORE

(71) Applicant: MITSUI HIGH-TEC, INC., Kitakyushu-shi, Fukuoka (JP)

(72) Inventors: Akira Nagai, Fukuoka (JP); Kazuki Namaike, Fukuoka (JP); Hidemi Sasaki, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 345 days.

(21) Appl. No.: 14/811,137

(22) Filed: Jul. 28, 2015

(65) Prior Publication Data

US 2016/0065040 A1 Mar. 3, 2016

(30) Foreign Application Priority Data

Aug. 27, 2014 (JP) .................................. 2014-172777

(51) Int. Cl.
*H02K 15/12* (2006.01)
(52) U.S. Cl.
CPC .................................. *H02K 15/12* (2013.01)
(58) Field of Classification Search
CPC .................................................... B29C 70/48
USPC .......... 264/272, 272.15, 242, 250, 260, 264; 425/579
See application file for complete search history.

(56) References Cited

U.S. PATENT DOCUMENTS

| 3,594,898 | A | * | 7/1971 | Lewandowski | ........ H01H 11/00 200/11 D |
| 4,845,837 | A | * | 7/1989 | Lloyd | ...................... H02K 1/17 264/272.2 |
| 5,684,352 | A | | 11/1997 | Mita et al. | |
| 2009/0189309 | A1 | | 7/2009 | Matsubayashi et al. | |
| 2011/0000079 | A1 | | 1/2011 | Fukumaru et al. | |
| 2011/0115126 | A1 | | 5/2011 | Matsubayashi et al. | |
| 2011/0223273 | A1 | * | 9/2011 | Honma | ................... B29C 45/54 425/145 |

(Continued)

FOREIGN PATENT DOCUMENTS

| JP | 05-236713 | 9/1993 |
| JP | 2003-304654 | 10/2003 |
| JP | 2006-204068 | 8/2006 |

(Continued)

OTHER PUBLICATIONS

Office Action issued in Japan Counterpart Patent Appl. No. 2014-172777, dated May 29, 2018, along with an English translation thereof.

(Continued)

*Primary Examiner* — Matthew J Daniels
*Assistant Examiner* — Kelsey C Grace
(74) *Attorney, Agent, or Firm* — Greenblum & Bernstein, P.L.C.

(57) ABSTRACT

A method of manufacturing a laminated iron core includes extruding resins from a plurality of plungers toward a plurality of through holes extending from an upper surface to a lower surface of a laminated body formed of a plurality of electromagnetic steel plates to fill the plurality of through holes with the resins. The plurality of plungers are mutually independent and an extrusion amount of the resin is controlled for each plunger.

9 Claims, 10 Drawing Sheets

(56) References Cited

U.S. PATENT DOCUMENTS

2012/0305180 A1    12/2012   Matsubayashi et al.
2014/0151926 A1    6/2014   Matsubayashi et al.

FOREIGN PATENT DOCUMENTS

| JP | 2007-215301 | 8/2007 |
| --- | --- | --- |
| JP | 2012-44800 | 3/2012 |
| JP | 2013-59185 | 3/2013 |

OTHER PUBLICATIONS

Office Action issued in China Counterpart Patent Appl. No. 201510535780.4, dated Jul. 27, 2018, along with an English translation thereof.

* cited by examiner

METHOD AND APPARATUS FOR MANUFACTURING LAMINATED IRON CORE

CROSS REFERENCE TO RELATED APPLICATION(S)

This application is based upon and claims the benefit of priority of Japanese Patent Application No. 2014-172777 filed on Aug. 27, 2014, the contents of which are incorporated herein by reference in its entirety.

BACKGROUND OF THE INVENTION

1. Field of the Invention

The present invention relates to a method and an apparatus for manufacturing a laminated iron core.

2. Description of the Related Art

A laminated iron core is a component of a motor core formed by integrating plural stacked electromagnetic steel plates. The motor core includes a rotor and a stator made of the laminated iron core. A motor is completed through a step of winding a coil on the stator, a step of attaching a shaft to the rotor, etc. The motor adopting the laminated iron core is used as a driving source of a refrigerator, an air conditioner, a hard disk drive, an electric power tool, etc., and is also used as the driving source of a hybrid car in recent years.

Normally, the laminated iron core constructing the rotor has plural through holes for receiving magnets (permanent magnets). As described in JP-A-2007-215301 as Patent Literature 1, after one or more magnets are inserted into each of the through holes, a resin is injected into the through hole, and a gap between an inner surface of the through hole and an outer surface of the magnet is sealed with the resin. A resin sealing apparatus including an upper die and a lower die is used for injecting the resin into the through hole (see FIG. 9 of JP-A-2007-215301 as Patent Literature 1 and FIG. 1 of JP-A-2006-204068 as Patent Literature 2).

Patent Literature 1: JP-A-2007-215301
Patent Literature 2: JP-A-2006-204068

SUMMARY OF THE INVENTION

According to review by the present inventors, lack of filling with a resin may occur in a step of filling a through hole of a laminated body with the resin and in this respect, the resin sealing apparatus has room for improvement still. The present inventors infer that one of causes of the lack of filling with the resin is dimension errors of the through hole and the magnet received in this through hole. For example, when the actual dimension of the through hole is larger than a design dimension while the actual dimension of the magnet received in this through hole is smaller than a design dimension, capacity of a gap between an inner surface of the through hole and an outer surface of the magnet is larger than a design value, and a larger amount of resin than the design value is required in order to fill this gap with the resin.

As shown in FIG. 1 of JP-A-2006-204068, the resin sealing apparatus includes plural plungers for respectively extruding resins toward plural through holes, and one driving unit for collectively driving these plungers. In the resin sealing apparatus, it is inferred that even when there is a difference in the amount (capacity of the gap described above) of the resin to fill each of the through holes, this difference cannot be handled sufficiently and this causes the lack of filling with the resin.

A non-limited object of one or more embodiments of the present invention is to provide a method and an apparatus of manufacturing a laminated iron core, capable of more surely preventing occurrence of lack of filling with a resin in a step of filling a through hole formed in a laminated body of electromagnetic steel plates with the resin.

A method of manufacturing a laminated iron core according to an aspect of the present invention includes extruding resins from a plurality of plungers toward a plurality of through holes extending from an upper surface to a lower surface of a laminated body formed of a plurality of electromagnetic steel plates to fill the plurality of through holes with the resins, and the plurality of plungers are mutually independent and an extrusion amount of the resin is controlled for each plunger.

According to the manufacturing method described above, occurrence of lack of filling with the resin can be prevented more surely by respectively independently controlling the extrusion amount of the resin of each of the plungers. Further, in order to prevent the occurrence of the lack of filling with the resin surely, the manufacturing method may further include monitoring an extrusion force of each plunger.

The laminated iron core manufactured by the manufacturing method may be a rotor or a stator. Also, the rotor and the stator may simultaneously be manufactured by the manufacturing method. That is, the plurality of through holes formed in the laminated body for the rotor and the plurality of through holes formed in the laminated body for the stator may be filled with the resins in one process.

An apparatus of manufacturing a laminated iron core according to an aspect of the present invention fills a plural of through holes extending from an upper surface to a lower surface of a laminated body formed of a plurality of electromagnetic steel plates with resins, and the apparatus includes: a plurality of cylinders which stores the resins to fill the plurality of through holes and which is adapted to communicate with the plurality of through holes when the laminated body is mounted on the apparatus; and a plurality of plungers which are inserted into the plurality of cylinders and respectively extrude the resins in the plurality of cylinders to the plurality of through holes, and the plurality of plungers are mutually independent and an extrusion amount of the resin is controlled for each plunger.

According to the manufacturing apparatus described above, occurrence of lack of filling with the resin can be prevented more surely by respectively independently controlling the extrusion amount of the resin of each of the plungers. Further, in order to prevent the occurrence of the lack of filling with the resin surely, the manufacturing apparatus may further include a plurality of sensors (for example, load cells) which detect extrusion forces of the plurality of plungers.

The apparatus may further include a plurality of driving rods which drives the plurality of plungers, and a motor which advances and retracts the plurality of driving rods, in the apparatus, each of the plurality of driving rods includes an inclined surface abutting on a proximal end of corresponding plunger, and the corresponding plunger is pushed into the cylinder by way of the inclined surface when the motor advances the driving rod. In order to control the amounts of the resins with which the plural through holes are filled every through hole while reducing upsizing of the apparatus, optionally, each of the plurality of driving rods extends in a direction substantially orthogonal to the corresponding plunger, and the plurality of driving rods are arranged radially in plan view.

The apparatus may further include an upper die and a lower die which are adapted to mount both of the laminated body for a rotor and the laminated body for a stator. By adopting such a configuration, the plural through holes formed in the laminated body for the rotor and the plural through holes formed in the laminated body for the stator can be filled with the resins in one process.

According to the aspects of the present invention, the occurrence of the lack of filling with the resin may be prevented more surely in filling the through holes formed in the laminated body of the electromagnetic steel plates with the resins.

DETAILED DESCRIPTION OF THE EXEMPLARY EMBODIMENTS

An embodiment of the present invention will be described in detail with reference to the accompanying drawings. In the following description, the same numerals are used in the same elements or elements having the same functions, and the overlap description is omitted. Here, a position of a configuration is represented based on a direction of a laminated body at the time of injecting a resin into a through hole. For example, a surface of the laminated body facing upwardly at the time of injecting the resin is represented as an "upper surface", and an opening of the through hole located in this upper surface is represented as an "upper side opening".

Laminated Iron Core Constructing Rotor

Figure 1A:
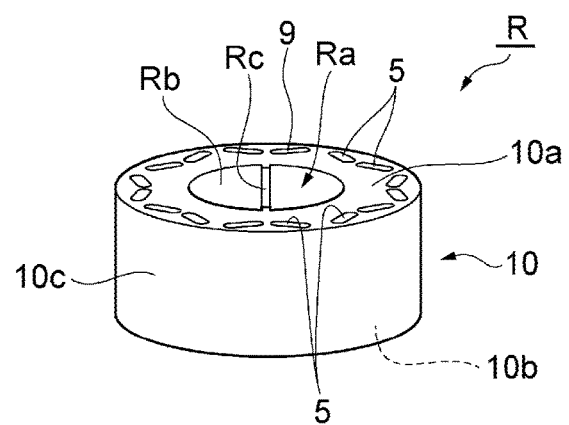
FIG. 1A is a perspective view showing a rotor made of a laminated iron core.

FIG. 1A is a perspective view of a laminated iron core R constructing a rotor. The laminated iron core R has substantially a cylindrical shape, and an opening Ra located in the center is provided to receive and mount a shaft (not shown). An inner peripheral surface Rb constructing the opening Ra is provided with a protruding key Rc.

Figure 2A:
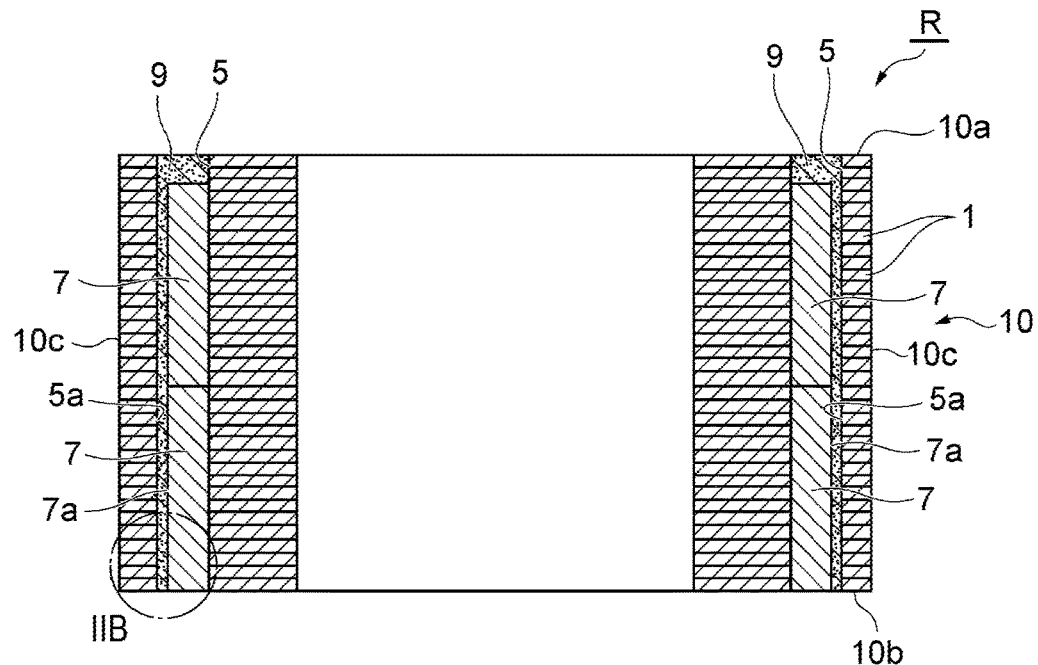
FIG. 2A is a longitudinal sectional view of the rotor shown in FIG. 1A.
Figure 2B:
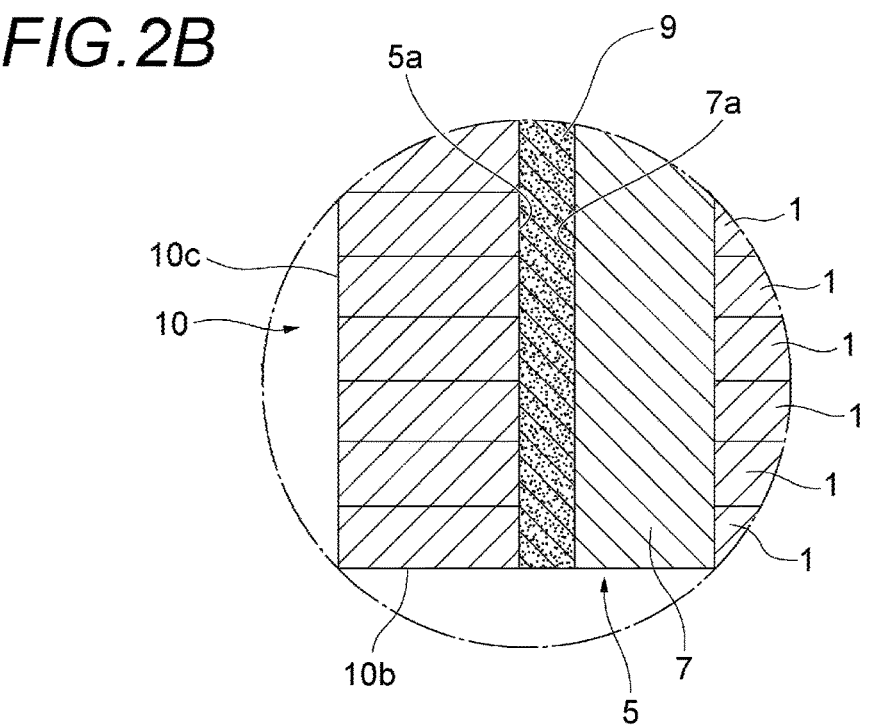
FIG. 2B is a schematic enlarged sectional view showing the inside of a through hole of the rotor encircled by a circle IIB in FIG. 2A.

The laminated iron core (rotor) R shown in FIG. 1A will be described with reference to FIGS. 2A and 2B. As shown in FIG. 2A, the laminated iron core R includes a laminated body 10 made of plural electromagnetic steel plates 1, plural through holes 5 extending from an upper surface 10a to a lower surface 10b of the laminated body 10, a magnet 7 received in each of the through holes 5, and a resin 9 with which a gap between an inner surface 5a of each of the through holes 5 and an outer surface 7a of the magnet 7 is sealed.

The laminated body 10 has a total of sixteen through holes 5 (see FIG. 1A). The two adjacent through holes 5 are paired, and eight pairs of through holes 5 are equally spaced along an outer periphery 10c of the laminated body 10. As described below, a resin is injected into the two paired through holes 5 through one cylinder 41 (see FIGS. 4 and 8, and the cylinder may also be called a pot). A pellet P (see FIG. 4, and the pellet may also be called a tablet) made of a thermosetting resin for filling is stored in the cylinder 41. In addition, the total number of through holes 5 is not limited to sixteen, and can be determined according to, for example, required performance or use of a motor. Also, a shape and a position of the through hole 5 can be determined according to, for example, required performance or use of the motor.

The two magnets 7 are received in each of the through holes 5 with the magnets 7 arranged vertically. The magnet 7 is a permanent magnet and, for example, a sintered magnet of a neodymium magnet etc. can be used. In addition, the number of magnets 7 inserted into each of the through holes 5 may be one, or three or more. A kind of magnet 7 can be determined according to, for example, required performance or use of the motor, and instead of the sintered magnet, for example, a bond magnet may be used.

The resin 9 is made of a cured product of a thermosetting resin. A concrete example of the thermosetting resin includes a resin composition including an additive agent, a curing initiator, and an epoxy resin. The additive agent includes a filler, a flame retardant, a stress reducer, etc. As the filler, for example, a granular substance obtained by crushing the cured product of the thermosetting resin may be used. The magnet 7 is fixed into the through hole 5 by injecting the resin 9 into the through hole 5. The resin 9 also performs a function of mutually bonding the vertically adjacent electromagnetic steel plates 1. By mutually bonding the electromagnetic steel plates 1 using the resin 9, the need for caulking used for mutually bonding the electromagnetic steel plates 1 conventionally can be eliminated.

Laminated Iron Core Constructing Stator

Figure 1B:
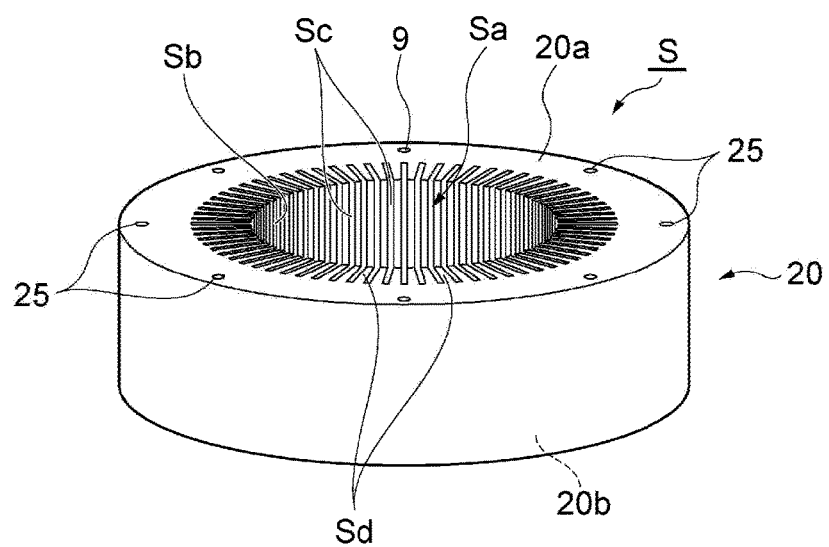
FIG. 1B is a perspective view showing a stator made of a laminated iron core.

FIG. 1B is a perspective view of a laminated iron core S constructing a stator. The laminated iron core S has substantially a cylindrical shape, and an opening Sa located in the center is formed to arrange the laminated iron core (rotor) R. An inner peripheral surface Sb of the laminated iron core S is formed with multiple grooves Sc extending in a thickness direction. A coil is wound on protrusions Sd formed by the grooves Sc.

The laminated iron core (stator) S shown in FIG. 1B has a configuration similar to that of the laminated iron core R described above except that a shape of each of the electromagnetic steel plates 1 differs and eight through holes 25 for mutually bonding the vertically adjacent electromagnetic steel plates 1 are included instead of the eight pairs of through holes 5 in which the magnets 7 are received. Each of the through holes 25 extends from an upper surface 20a to a lower surface 20b of a laminated body 20, and is filled with the resin 9. In addition, the number of through holes 25 is not limited to eight, and can be determined according to, for example, required performance or use of the motor. Also, a shape and a position of the through hole 25 can be determined according to, for example, required performance or use of the motor.

Manufacturing Apparatus of Laminated Iron Core

A manufacturing apparatus 100 of the laminated iron core will be described with reference to FIGS. 3 to 8. The manufacturing apparatus 100 has the following features.

(Feature 1): It is constructed so that plural plungers 42 are mutually independent and an extrusion amount of resin is controlled for each plunger 42.

(Feature 2): The through holes 5 formed in the laminated body 10 for the rotor and the through holes 25 formed in the laminated body 20 for the stator can be filled with the resins in one process.

Figure 3:
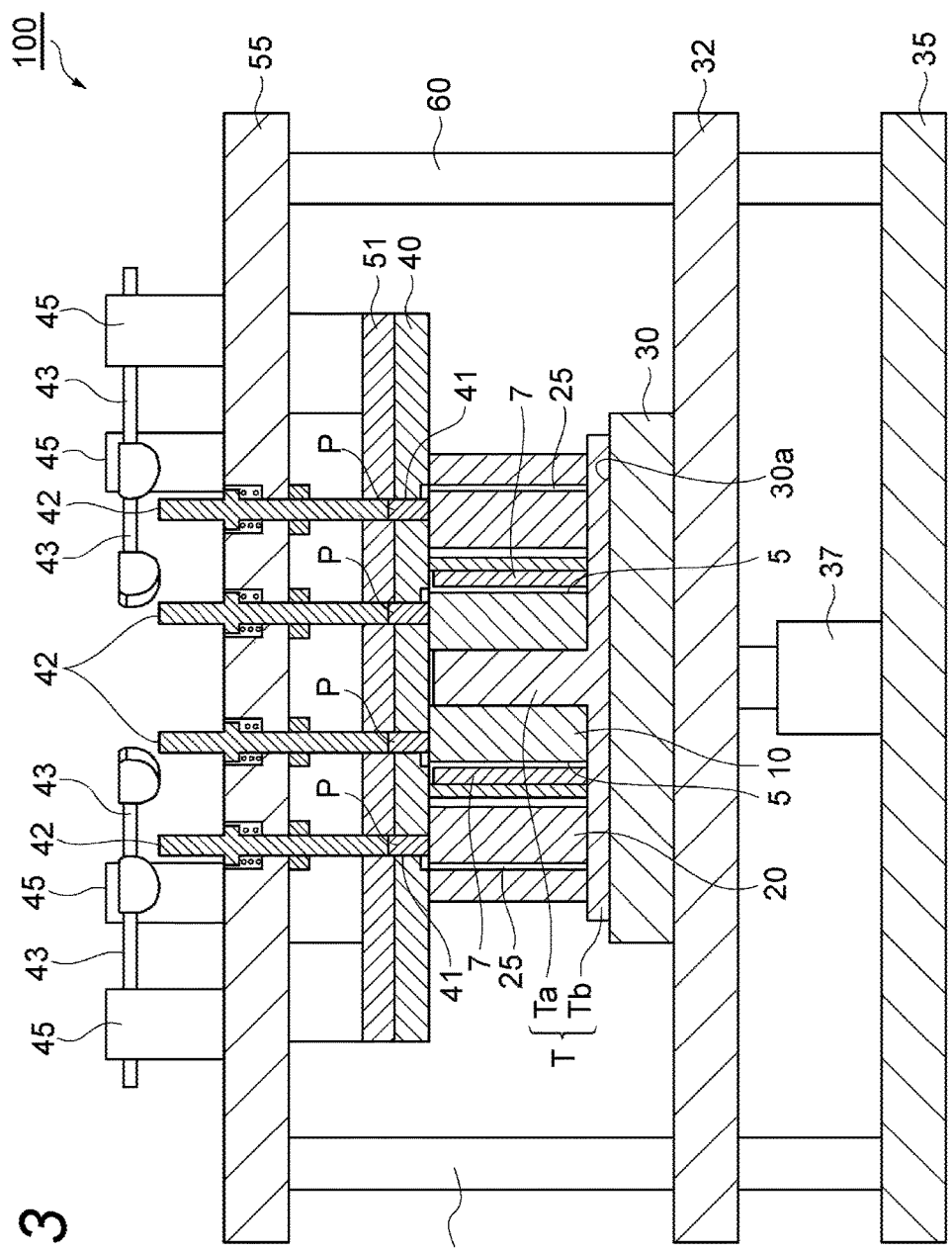
FIG. 3 is a schematic sectional view showing an embodiment of a manufacturing apparatus according to the present invention.
Figure 5:
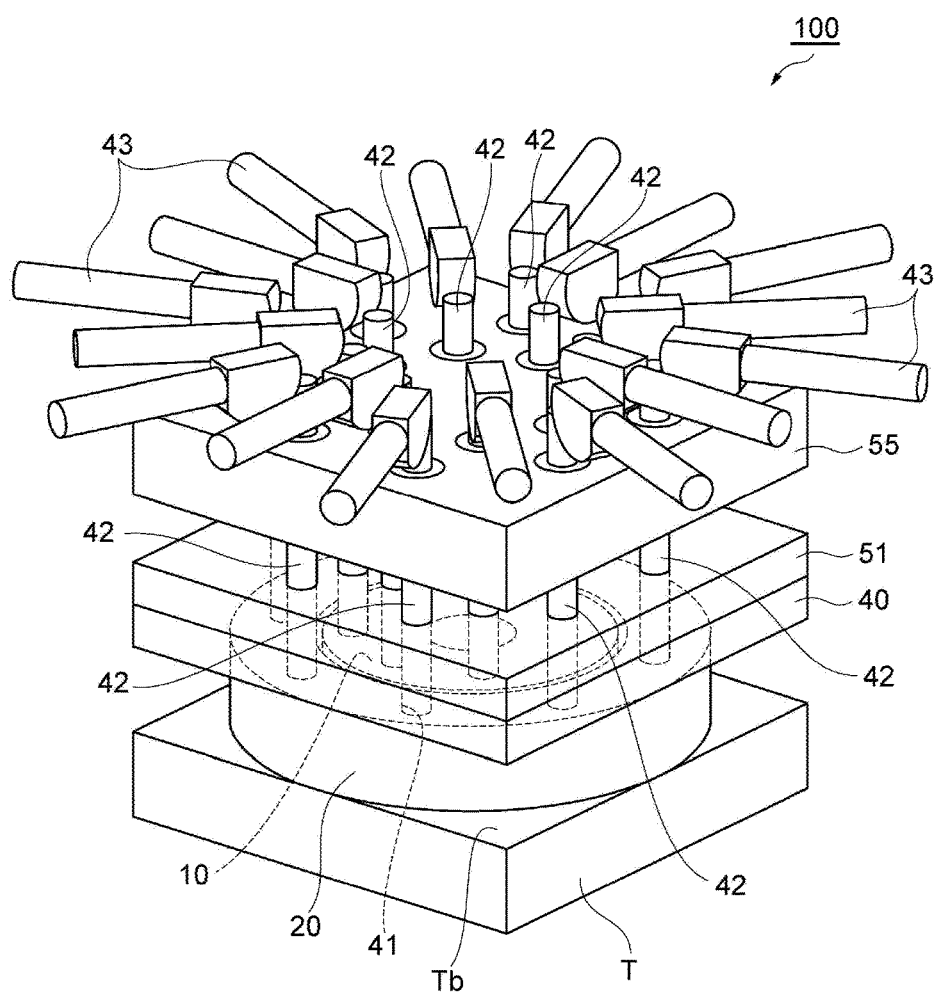
FIG. 5 is a perspective view schematically showing a state in which both of a laminated body for the rotor and a laminated body for the stator are set in the manufacturing apparatus shown in FIG. 3.
Figure 6:
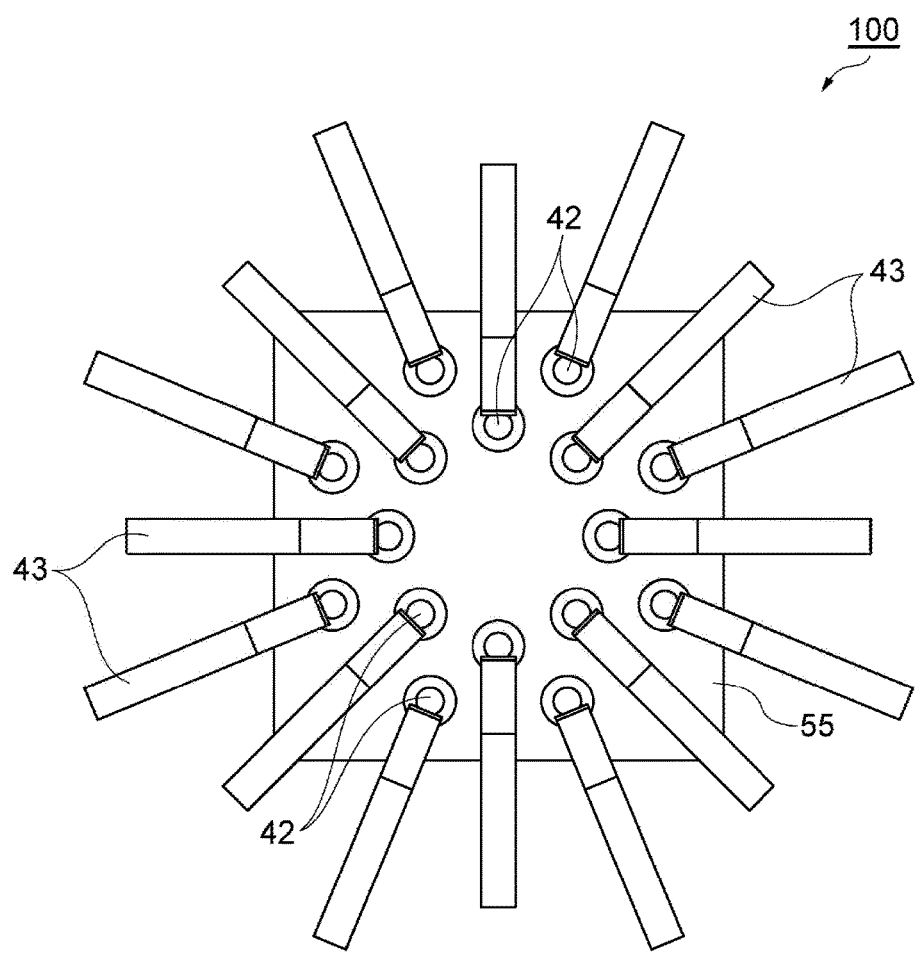
FIG. 6 is a plan view schematically showing a configuration of an upper surface of the manufacturing apparatus shown in FIG. 5.

As shown in FIGS. 3, 5 and 6, the manufacturing apparatus 100 includes the total of sixteen mutually independent plungers 42, a total of sixteen driving rods 43 for individually driving these plungers 42, motors 45 for individually advancing and retracting the driving rods 43, and plural cylinders 41 storing the pellets P made of the thermosetting resins for filling.

FIG. 3 extracts and illustrates a part of the configuration of the manufacturing apparatus 100, and is a longitudinal sectional view schematically showing a state in which both of the laminated body 10 and the laminated body 20 are mounted between a lower die 30 and an upper die 40. The manufacturing apparatus 100 shown in FIG. 3 includes a conveyance tray T in which the laminated body 10 and the laminated body 20 are mounted, the lower die 30 having a placement surface 30a of the conveyance tray T, and the upper die 40 which is arranged over the laminated body 10 and the laminated body 20 and has the total of sixteen cylinders 41.

The conveyance tray T includes a shaft part Ta inserted into the opening Ra of the laminated body 10 for the rotor, and a bottom plate Tb for fixing the lower end of the shaft part Ta and abutting on the lower surface 10b of the laminated body 10 and the lower surface 20b of the laminated body 20. The laminated body 10 is arranged in the outside of the shaft part Ta, and the laminated body 20 is arranged in the outside of the laminated body 10. By adopting the conveyance tray T attachable to and detachable from the lower die 30, the laminated body 10 and the laminated body 20 can be prepared on the conveyance tray T in a position different from an installation place of the manufacturing apparatus 100 and then, the laminated body 10 and the laminated body 20 together with the conveyance tray T can be mounted in the manufacturing apparatus 100. In a stage of preparing the laminated body 10 on the conveyance tray T, work of putting the magnet 7 in each of the through holes 5 may be done.

The lower die 30 has a function of holding the conveyance tray T and also applying heat to the laminated bodies 10, 20 from the lower side, and incorporates a heater (not shown). The lower die 30 is formed on an upward and downward movement plate 32, and is moved in a vertical direction with movement of the upward and downward movement plate 32. The upward and downward movement plate 32 is configured to be upwardly and downwardly moved by a lower die upward and downward movement mechanism 37 formed on a lower fixed plate 35.

The upper die 40 has a function of applying heat to the laminated bodies 10, 20 from the upper side, and incorporates a heater (not shown). The upper die 40 has a function of storing the pellets P made of the thermosetting resins for filling, and has the total of sixteen cylinders 41 in which the pellets P are stored as described above. A lower surface of the upper die 40 is formed with a recess 40a constructing a part of a flow path Q ranging from a lower part of the cylinder 41 to the through holes 5, 25, and the lower surface of the upper die 40 abuts on the upper surfaces 10a, 20a of the laminated bodies 10, 20 to thereby construct the flow path Q (see FIG. 4). This flow path Q is also called a runner.

The upper die 40 is upwardly moved with upward movement of the laminated bodies 10, 20 by upward movement of the lower die 30. The upper side of the upper die 40 is provided with a fixed pedestal 51 for regulating upward movement of the upper die 40 (see FIG. 3). The fixed pedestal 51 has a total of sixteen through holes 51a into which the plungers 42 are inserted. In a state in which the upper die 40 is not upwardly moved yet, space is formed between an upper surface 40b of the upper die 40 and a lower surface 51b of the fixed pedestal 51 and using this space, work of putting the pellet P in the cylinder 41 is done. The fixed pedestal 51 is fixed to an upper fixed plate 55. The upper fixed plate 55 has a total of sixteen through holes 55a into which the plungers 42 are inserted (see FIG. 7). The upper fixed plate 55 is joined to the lower fixed plate 35 by guide posts 60 extending in the vertical direction. The guide posts 60 perform a function of guiding upward and downward movement of the upward and downward movement plate 32 described above.

Figure 4:
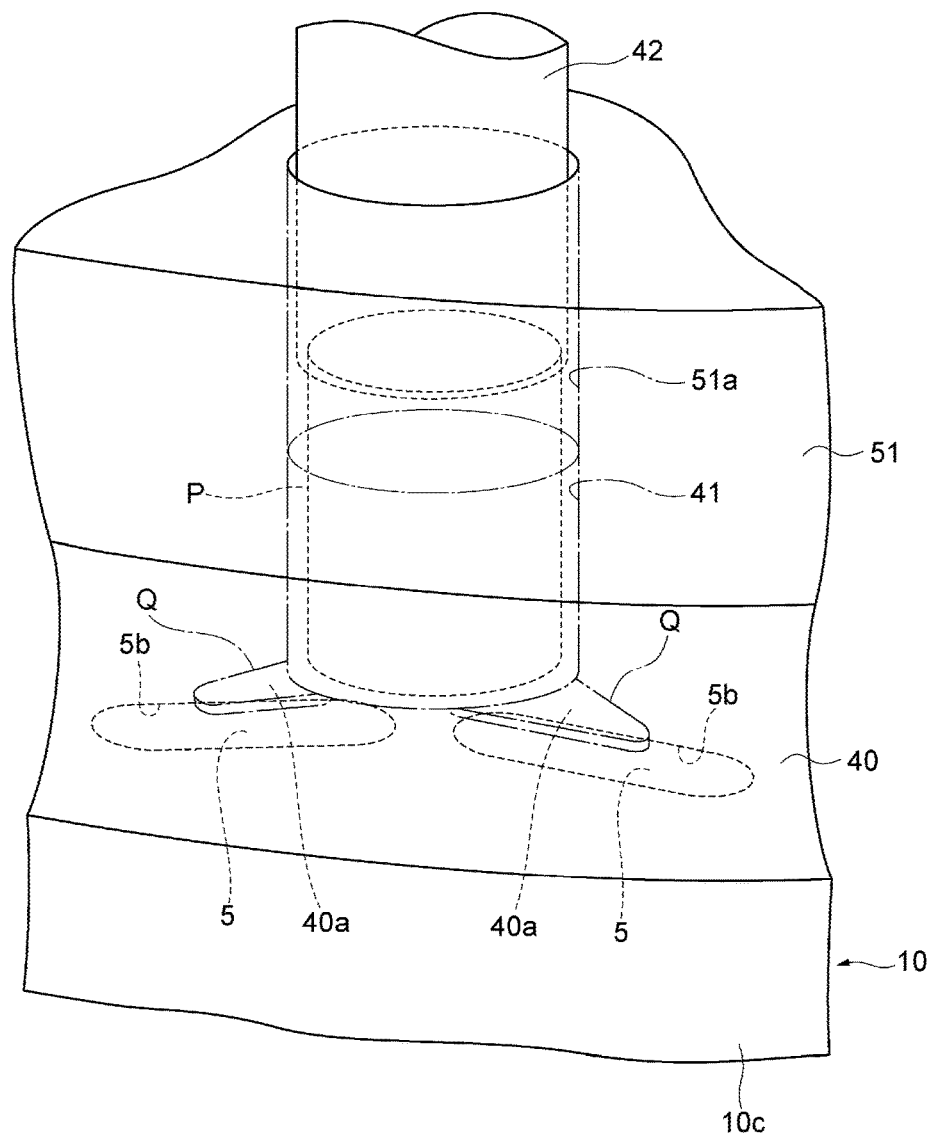
FIG. 4 is a perspective view schematically showing the vicinity of an upper side opening of the through hole before the start of work of injecting a resin.
Figure 7:
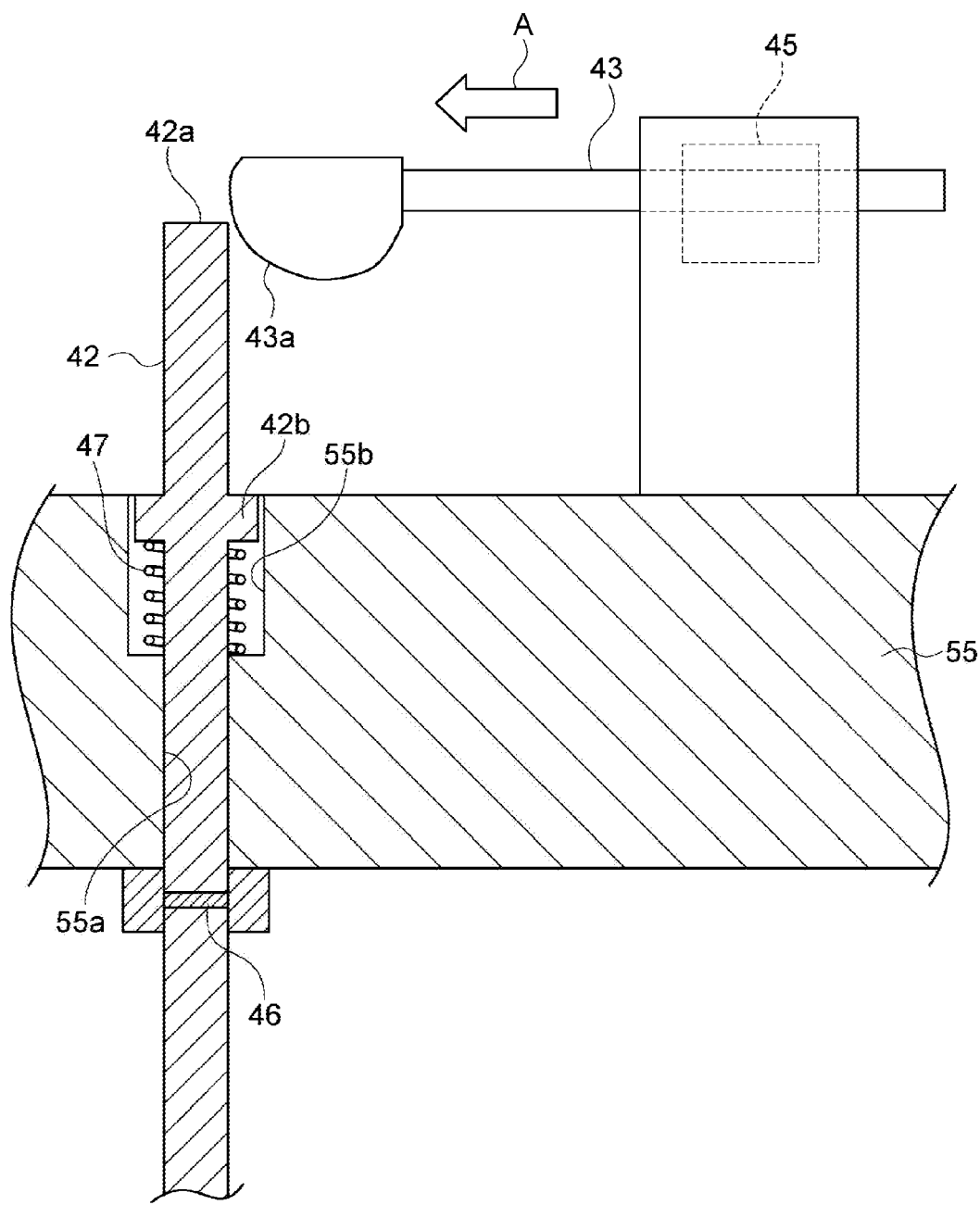
FIG. 7 is a schematic view of a driving unit of a plunger.

The plunger 42 extends so as to range from the upper side of the upper fixed plate 55 to the cylinder 41 of the upper die 40 through the through hole 55a and the through hole 51a (see FIG. 4). The plungers 42 are configured to respectively extrude melted bodies of the pellets P stored in the cylinders 41 to the through holes 5, 25 of the laminated bodies 10, 20. As shown in FIGS. 5 and 6, the manufacturing apparatus 100 includes the eight plungers 42 for respectively injecting resins into the eight pairs of through holes 5 of the laminated body 10, and the eight plungers 42 for respectively injecting resins into the eight through holes 25 of the laminated body 20. These plungers 42 are respectively arranged in positions corresponding to the two paired through holes 5 of the laminated body 10 and positions corresponding to the through holes 25 of the laminated body 20. As shown in FIG. 7, each of the plungers 42 is provided with a load cell (sensor) 46 for detecting an extrusion force.

The driving rod 43 is provided for downwardly pushing the plunger 42. The driving rod 43 is advanced (in a direction of arrow A of FIG. 7) and retracted by the motor 45. As shown in FIG. 7, the driving rod 43 has an R surface (inclined surface) 43a abutting on a proximal end 42a of the plunger 42, and is configured to downwardly push the plunger 42 through the R surface 43a facing downwardly when the motor 45 advances the driving rod 43. One driving rod 43 is equipped with one motor 45, and each of the motors 45 is individually controlled to thereby individually control a push amount of each of the plungers 42. As the motor 45, a servomotor, a stepping motor, etc. can be used. In addition, the plunger 42 downwardly pushed by the motor 45 is returned to an upward position by a repulsion force of a coil spring 47 in an example shown in FIG. 7. The upper fixed plate 55 is formed with a recess 55b for receiving the coil spring 47. Also, the middle of the plunger 42 is provided with a flange part 42b constructing a spring seat of the coil spring 47.

As shown in FIGS. 5 and 6, each of the driving rods 43 extends in a direction (substantially a horizontal direction) substantially orthogonal to the plunger 42, and the plural driving rods 43 are arranged radially in plan view. That is, each of the driving rods 43 extends from a position of the plunger 42 toward the outside (in a radial direction of the laminated bodies 10, 20). By adopting such a configuration, the extrusion amount of resin can be controlled for each plunger 42 while reducing upsizing of the manufacturing apparatus 100. Space to arrange the plural motors 45 can sufficiently be obtained by radially extending the plural driving rods 43 in the radial direction from the center side. As shown in FIG. 6, the driving rods 43 for injecting the resin into the through holes 5 and the driving rods 43 for injecting the resin into the through holes 25 are arranged alternately in a circumferential direction. In addition, an angle between a horizontal plane and an extension direction of the plunger 42 could be about 0 to 10°.

Manufacturing Method of Laminated Iron Core

A manufacturing method of the laminated iron cores R, S constructing the rotor and the stator will be described. The laminated iron cores R, S are manufactured through the following steps.
  (A) A step of respectively preparing the laminated bodies 10, 20 made of the plural electromagnetic steel plates 1.
  (B) A step of inserting the magnet 7 into each of the through holes 5 of the laminated body 10.
  (C) A step of injecting thermosetting resins into the through holes 5, 25 after the above step (B), the step of controlling an extrusion amount of the thermosetting resin for each plunger 42.
  (D) A step of curing the thermosetting resins injected into the through holes 5, 25 in the above step (C) with heat.

First, the laminated bodies 10, 20 made of the plural electromagnetic steel plates 1 are prepared (step (A)). As described above, the laminated body 10 has the plural through holes 5 which extend from the upper surface 10a to the lower surface 10b and receive the magnets 7. Before filling with a resin, the magnet 7 is inserted into the through hole 5 (step (B)). On the other hand, the laminated body 20 has the plural through holes 25 which extend from the upper surface 20a to the lower surface 20b and mutually bond the vertically adjacent electromagnetic steel plates 1 by the resin 9.

Next, work of injecting the resins into the through holes 5, 25 using the manufacturing apparatus 100 (see FIG. 3) including the lower die 30 and the upper die 40, adapted to mount both of the laminated bodies 10, 20 is done in one process. In this process, the extrusion amount of the thermosetting resin is controlled for each plunger 42. By respectively independently controlling the extrusion amount of the resin of each of the plungers 42, occurrence of lack of filling with the resin can be prevented more surely. In order to prevent the occurrence of the lack of filling with the resin furthermore surely, an extrusion force of each of the plungers 42 may be monitored by the load cell 46 while the resin is injected.

In order to perform step (C), as shown in FIG. 4, the pellet P is put in the cylinder 41 of the upper die 40 and then, the plunger 42 is mounted in the cylinder 41. The pellet P is melted by heating the pellet P using the heater (not shown) built into the upper die 40. After the pellet P is melted inside the cylinder 41, the plunger 42 is downwardly pushed before heat curing progresses completely and thereby, the thermosetting resin is injected into the through hole 5 through the flow path Q (step (C)). Depending on the size of the through hole 5, time of work of injecting the thermosetting resin is preferably about 15 to 30 seconds from the standpoint of improvement in a throughput. The injection of the resin into the through hole 5 is described herein, but injection of a resin into the through hole 25 has only to be performed like the injection of the resin into the through hole 5 except that the resin is injected from one cylinder 41 to one through hole 25 instead of injecting the resin from one cylinder 41 to a pair of through holes 5.

The heat curing of the thermosetting resins injected into the through holes 5, 25 progresses by applying heat to the laminated bodies 10, 20 using the heater (not shown) included in the manufacturing apparatus 100 (step (D)). Depending on a kind of thermosetting resin, a heating temperature of the thermosetting resin in step (D) is preferably about 150 to 180° C. From the standpoint of improvement in a throughput, time of work in step (D) is preferably about 40 to 60 seconds.

Figure 8:
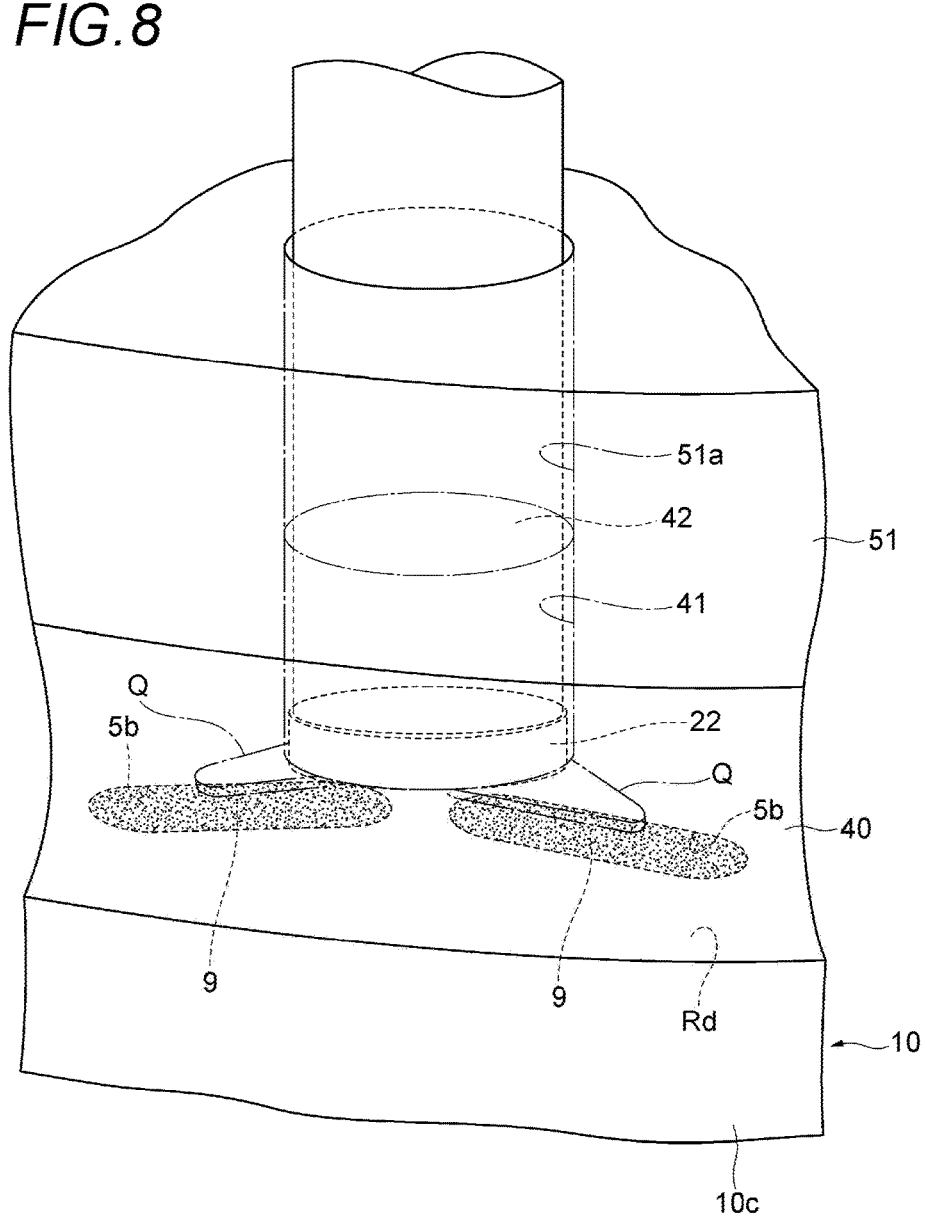
FIG. 8 is a perspective view schematically showing the vicinity of the upper side opening of the through hole after the completion of work of injecting the resin.

FIG. 8 is a perspective view schematically showing the vicinity of an upper side opening 5b of the through hole 5 after the completion of work of injecting the resin. As shown in FIG. 8, a cured product (surplus resin piece 22) of the thermosetting resin which does not fit in the through hole 5 and remains in the flow path Q and a lower portion of the cylinder 41 adheres to an upper surface of the laminated iron core R. After all the surplus resin piece 22 is removed, the laminated iron core R constructing the rotor is completed through finish processing etc. of an upper surface Rd. Also, the laminated iron core S is completed through similar finish processing etc.

According to the embodiment described above, occurrence of lack of filling with the resin can be prevented more surely by respectively independently controlling the extrusion amount of the resin of each of the plungers 42 in step (C). Also, according to the embodiment described above, for example, when the amount of the resin to fill the through hole 5, 25 is grasped previously, the pellet P with the size suitable for the amount of the resin can be selected to reduce the amount of generation of the surplus resin piece 22.

The embodiment of the present invention has been described above, but the present invention is not limited to the embodiment described above. For example, the embodiment described above illustrates the manufacturing apparatus 100 configured to inject the thermosetting resins into the through holes 5, 25 from the side of the upper die 40, but the manufacturing apparatus configured to inject the thermosetting resins into the through holes 5, 25 from the side of the lower die 30 may be used. Alternatively, the manufacturing apparatus configured to inject the thermosetting resins into the through holes 5 from the side of the upper die 40 and inject the thermosetting resins into the through holes 25 from the side of the lower die 30 may be used. In reverse, the manufacturing apparatus configured to inject the thermosetting resins into the through holes 25 from the side of the upper die 40 and inject the thermosetting resins into the through holes 5 from the side of the lower die 30 may be used.

The embodiment described above illustrates the case of using the laminated body (so-called loose core) in which the laminated electromagnetic steel plates 1 are not bonded mutually, but the laminated bodies 10, 20 in which the electromagnetic steel plates 1 are bonded mutually by caulking may be adopted.

Figure 9A:
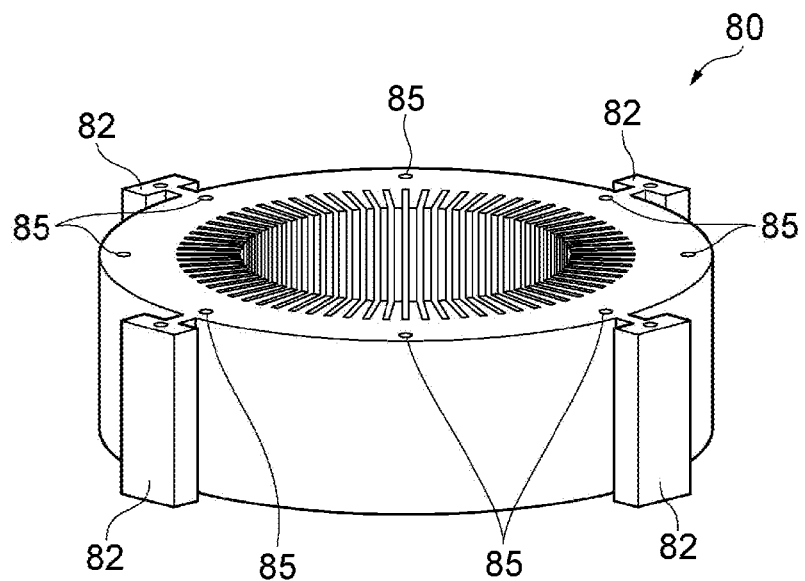
FIG. 9A is a perspective view showing a laminated body for a stator bonded by dummy caulking parts.
Figure 9B:
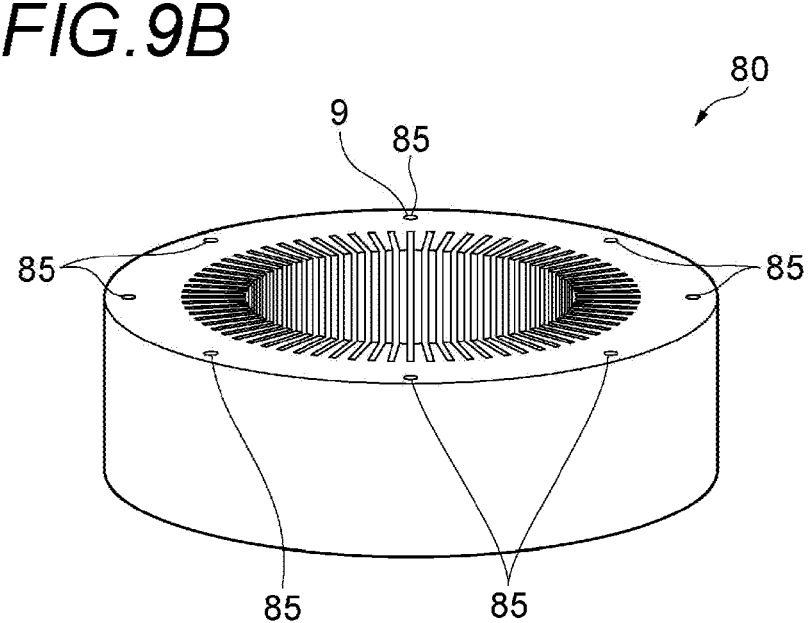
FIG. 9B is a perspective view showing the stator made of a laminated iron core manufactured through a step of cutting the dummy caulking parts and a step of inserting a resin material into a through hole.

The embodiment described above illustrates the method and the apparatus for manufacturing the rotor and the stator from the so-called loose core, but the electromagnetic steel plates 1 may be temporarily bonded mutually by a dummy caulking part from the standpoint of improvement in handing of the loose core. FIG. 9A is a perspective view showing a laminated body 80 for a stator having four dummy caulking parts 82. Until the electromagnetic steel plates 1 are fixed mutually by resins 9, the shape is maintained by the dummy caulking parts 82 present in the outside of an annular part of the laminated body 80. FIG. 9B is a perspective view showing the laminated iron core (stator) S manufactured through a step of cutting the dummy caulking parts 82 and a step of inserting a resin material into a through hole. The plural electromagnetic steel plates 1 constructing the laminated iron core S are bonded by the resins 9 inserted into through holes 85 rather than caulking. The dummy caulking parts may be adopted in manufacture of the laminated iron core (rotor) R (not shown).

The embodiment described above illustrates the method in which the through holes 5 of the laminated body 10 and the through holes 25 of the laminated body 20 are filled with the resins in one step using the manufacturing apparatus 100 including the lower die 30 and the upper die 40 capable of mounting both of the laminated body 10 for the rotor and the laminated body 20 for the stator, but the through holes may be respectively filled with the resins by separate apparatuses or in two steps by the same apparatus.

Figure 10:
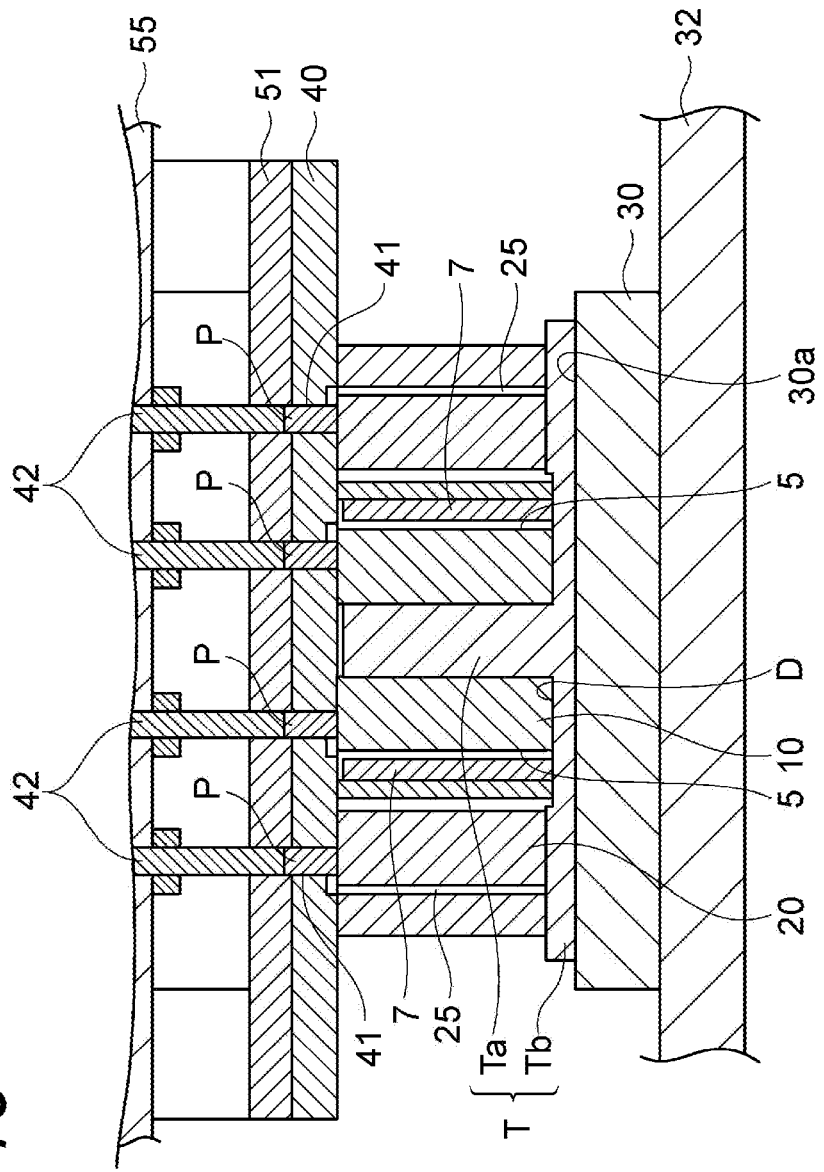
FIG. 10 is a schematic enlarged sectional view showing a part of the manufacturing apparatus including a conveyance tray in which step processing is performed.

The embodiment described above illustrates the case constructed so that the laminated body 10 for the rotor and the laminated body 20 for the stator have the same thickness by laminating the electromagnetic steel plates 1 with the same number, but when the laminated bodies 10, 20 respectively have different thicknesses, heights of the upper surfaces 10a, 20a of the laminated bodies 10, 20 may be aligned by performing step processing in the conveyance tray T. For example, when the thickness of the laminated body 10 is thicker than that of the laminated body 20, the heights of the upper surfaces 10a, 20a of the laminated bodies 10, 20 can be aligned by performing the step processing D for recessing a region in which the laminated body 10 is placed on the bottom plate Tb of the conveyance tray T as shown in FIG. 10. Accordingly, the resins can surely be injected into the laminated bodies 10, 20 without creating a gap between the upper die 40 and the opposed upper surfaces 10a, 20a of the laminated bodies 10, 20. When the thickness of the laminated body 20 is thicker than that of the laminated body 10, in a manner opposite to the above, the step processing for recessing a region in which the laminated body 20 is placed on the bottom plate Tb could be performed. Also, when the resins are injected from the side of the lower die 30, the step processing could be performed in the upper die 40 with the bottom plate Tb remaining a flat surface.

What is claimed is:

1. A method of manufacturing a laminated iron core, the method comprising:
   extruding resin from a plurality of plungers toward a plurality of through holes extending from an upper surface to a lower surface of a laminated body formed of a plurality of electromagnetic steel plates to fill the plurality of through holes with the resin, wherein
   the plurality of plungers are mutually independent and an extrusion amount of the resin is controlled for each plunger,
   providing a corresponding driving rod that extends in a direction substantially orthogonal to a corresponding plunger among the plurality of plungers, and
   pushing the corresponding plunger in one of an upward and downward direction via the corresponding driving rod such that the extrusion amount of the resin by the corresponding plunger is controlled.

2. The method according to claim 1, further comprising monitoring an extrusion force of each plunger.

3. The method according to claim 1, wherein the laminated iron core is a rotor.

4. The method according to claim 1, wherein the laminated iron core is a stator.

5. The method according to claim 1, wherein the plurality of through holes formed in the laminated body for the rotor and the plurality of through holes formed in the laminated body for the stator are filled with the resin in one process.

6. The method according to claim 1, further comprising:
   at least one of advancing and retracting a movement of the corresponding driving rod in the direction substantially orthogonal to the corresponding plunger via a motor such that the corresponding driving rod engages the corresponding plunger and the extrusion amount of the resin is controlled.

7. The method according to claim 1, further comprising:
   providing a plurality of driving rods that include the corresponding driving rod,
   and arranging the plurality of driving rods so as to extend radially to engage the plurality of plungers.

8. The method according to claim 6, further comprising:
   providing a plurality of driving rods that include the corresponding driving rod,
   and arranging the plurality of driving rods so as to extend radially to engage the plurality of plungers.

9. The method according to claim 1, further comprising:
   providing sensors to monitor an extrusion force by which the extrusion amount is extruded.

* * * * *